Sept. 26, 1933.  H. PHILLIPS  1,928,073
PLANER BAND SAW
Filed June 9, 1931
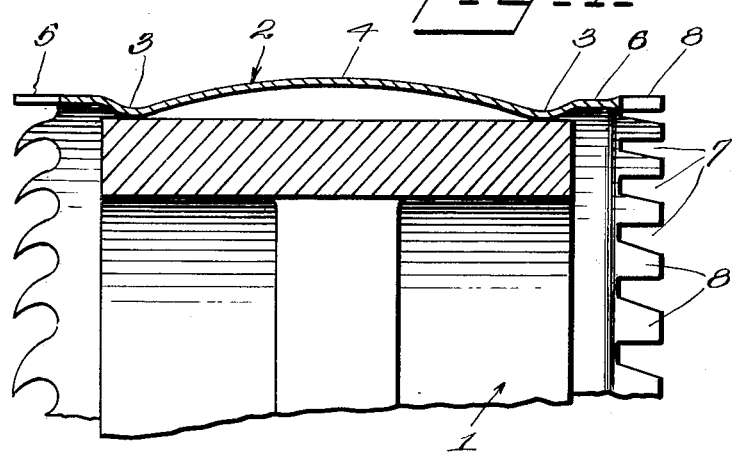
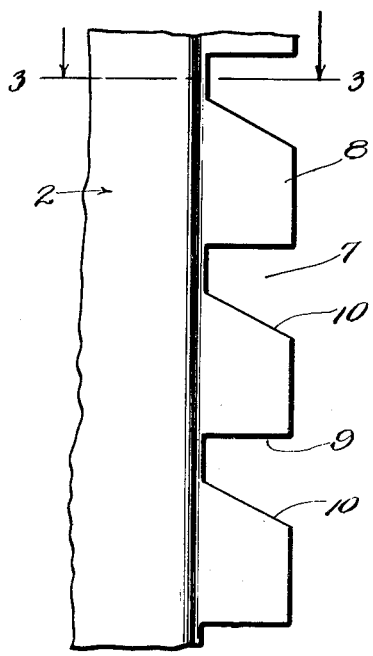
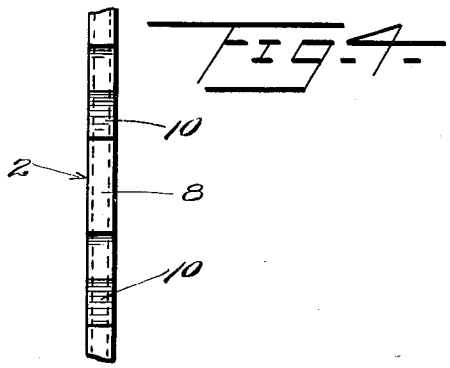
Inventor
*Hugo Phillips*
By *Watson E. Coleman*
Attorney Patented Sept. 26, 1933

1,928,073

UNITED STATES PATENT OFFICE 1,928,073

PLANER BAND SAW

Hugo Phillips, Hydesville, Calif.

Application June 9, 1931. Serial No. 543,171

3 Claims. (Cl. 143—140)

This invention relates to improvements in band saws, and pertains particularly to a planer band saw.

The primary object of the present invention is to provide an improved band saw in which the back edge is provided with teeth of a character to smooth or plane off the opposed faces of the material, which are formed by the band saw and between which the saw passes, so that the material will leave the sawing machine already planed and ready for use.

Another object of the invention is to provide a band saw having planer teeth of a novel character formed along the back edge thereof, which teeth are so designed that no swaging, setting or grinding thereof will be necessary as they are of a thickness greater than the body of the saw and are provided with square edges so that both sides thereof cut or plane the surface of the material over which they pass.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a transverse sectional view through a band saw constructed in accordance with the present invention and through a portion of a supporting pulley therefor.

Figure 2 is a fragmentary view in elevation of a saw constructed in accordance with the present invention, showing a portion of the back or planer edge thereof.

Figure 3 is a sectional view taken on the line 3—3 of Figure 2.

Figure 4 is a view looking toward that edge of the saw body in which the planer teeth are formed.

Referring now more particularly to the drawing, wherein like numerals of reference indicate corresponding parts throughout the several views, the numeral 1 indicates generally a portion of a supporting pulley over which the present saw is shown trained, the saw being indicated generally by the numeral 2.

The main body of the saw here illustrated is preferably constructed in the same manner as the saw forming the subject matter of my Patent No. 1,790,282, that is, adjacent each edge the body thereof is provided with the circumferentially extending tire or tread portion 3 which forms a bend in the saw body which is the reverse of the main transverse curve on which the sawing is formed, this main or transverse curved portion being indicated generally by the numeral 4.

By providing these tires which, as previously stated, extend circumferentially of the saw, one adjacent each edge thereof, the cutting teeth 5 of the saw are prevented from coming in contact with the pulley 1 and the planer teeth, which form the subject matter of the present invention, are also prevented from engaging the pulley wheels and are therefore prevented from being injured. It will, of course, be understood also that the same other advantages will be had in the present saw structure by providing the tires 3, as are set forth in the patent above referred to, the principal of which is that the cracking of the saw at the edges will also be prevented.

In carrying out the present invention the back of the saw is provided with the short straight portion 6 between the rear tread 3 and the back edge and a part of this portion or band, as it may be termed since it extends completely about the saw, is of slightly heavier gauge metal than the body of the saw and has cut thereinto the gullets 7, thus forming the teeth 8. One of the transverse surfaces of each of the teeth extends in a plane transversely of the saw body, as indicated at 9, while the other surface 10 extends in a plane oblique to the saw body. The side edges or corners of the straight face 9 of each tooth form the planers which smooth off the surfaces between which the saw passes.

From the foregoing it will be readily seen that by forming the portion of the saw, in which the planer teeth are formed, of a heavier gauge of material than the body of the saw, the planer teeth may be provided with the square surfaces 9 and 10, and both side edges of the surfaces 9 will operate as planing or smoothing blades against the opposed surfaces of the material through which the saw is passing.

It will also be understood that by forming the saw with the tires 3, the sides of the planer teeth will be prevented from contacting with the pulley over which the saw passes and thus will not be damaged as would be the case if they ran flat against the pulley surfaces.

Having thus described the invention, what is claimed is:

1. A saw of the character described, comprising a body of substantial width having cutting teeth formed along one edge, a portion of the saw extending inwardly from the other edge being formed of material of a heavier gauge than the body of the saw, and planer teeth formed along the said other edge in the portion of heavier gauge, said teeth having the advance edges thereof flat and extending in a plane at right angles to the side faces of the saw to provide sharp side cutting corners.

2. A saw blade provided with a plurality of planing teeth formed along the edge of the saw blade opposite the cutting edge, each of said planing teeth having relatively long parallel side surfaces lying throughout in planes offset from the sides of the saw and connected by an edge face disposed in a plane transversely to the saw, the corner edges formed by the joinder of the side surfaces with said edge face constituting cutting edges.

3. A saw blade provided with a plurality of planing teeth formed along the edge of the saw blade opposite the cutting edge, said blade being of heavier gauge metal along the edge opposite the cutting edge to form a broad heavy edge band in which each side face lies in a plane offset from the adjacent face of the main body portion of the saw, said band being cut-out at intervals along its length to form the planing teeth gullets, the bottoms of which terminate short of the inner edge of the band.

HUGO PHILLIPS.